Patented July 21, 1953

2,646,433

UNITED STATES PATENT OFFICE 2,646,433

SYNTHESIS OF QUINALDINIUM SALTS

Donald W. Heseltine, Rochester, N. Y., assignor to Eastman Kodak Company, Rochester, N. Y., a corporation of New Jersey No Drawing. Original application April 8, 1950, Serial No. 154,881. Divided and this application May 19, 1951, Serial No. 227,273

8 Claims. (Cl. 260—286)

This invention relates to a new method for preparing quinaldinium salts and to new quaternary salts obtained thereby.

It is known that quinaldine bases can be prepared by reacting together an aromatic primary amine and an aldehyde in the presence of an oxidizing agent and a hydrohalogen acid (Doebner & v. Miller, Ber. 14 (1881), 2816). While it is known that some secondary amines, or a mixture of secondary amines, are formed in this reaction by the reduction of the intermediate aldimines formed, no quaternary salt can be isolated.

I have now found that acid addition salts of aromatic secondary amines can be reacted with aldehydes, or compounds giving rise thereto, in the presence of an oxidizing agent to give, not a quinaldine base, but a quinaldinium salt.

It is, therefore, an object of my invention to provide a new method for preparing quinaldinium salts. A further object is to provide quinaldinium salts, some of which have not heretofore been known. Other objects will become apparent from a consideration of the following description and examples.

According to my invention I provide a new process for preparing quinaldinium salts which comprises reacting an acid addition salt of an aromatic secondary amine with a compound selected from the group consisting of acetaldehyde, paraldehyde, aldol, and crotonaldehyde in the presence of an oxidizing agent.

The aromatic secondary amines whose acid addition salts can be used in my invention comprise the N-alkylaryl amines, such as N-methylaniline, N-ethylaniline, N-methyl-p-chloroaniline, N-methyl-p-toluidine, etc., the diarylamines such as diphenylamine, p,p'-ditolylamine, p,p'-dichlorodiphenylamine, etc. and heterocyclic secondary amines, such as tetrahydroquinoline, dihydroindole (indoline), carbazole, 3,4,5,6-tetrahydrocarbazole, phenothiazine (thiodiphenylamine), 2,3-trimethyleneindoline, etc. The acid addition salts of the N-alkylaryl and diaryl amines useful in practicing my invention can advantageously be represented by the following general formula:

I.

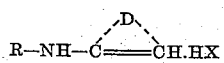

wherein R represents an alkyl group, such as methyl, ethyl, etc., or an aryl group, such as phenyl, o-, m-, or p-tolyl, o-, m-, or p-chlorophenyl, o-, m-, or p-hydroxyphenyl, etc. (e. g. a mononuclear aryl group of the benzene series), D represents the nonmetallic atoms necessary to complete an aromatic nucleus, such as phenyl, o-, m-, and p-chlorophenyl, etc. (e. g. a mononuclear aryl group of the benzene series), and X represents an acid radical, e. g. chlorine, bromine, iodine, sulfate, perchlorate, thiocyanate, alkyl sulfate (e. g. methyl sulfate), toluenesulfonate, etc. The acid addition salts of the heterocyclic secondary amines useful in practicing my invention can advantageously be represented by the following general formula:

II.

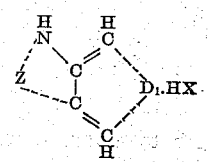

wherein $D_1$ represents the non-metallic atoms necessary to complete an aromatic nucleus, such as phenyl, chlorophenyl, hydroxyphenyl, etc. nuclei (e. g. an aromatic nucleus of the benzene series), X has the meaning given above, and Z represents the non-metallic atoms necessary to complete a heterocyclic nucleus containing from 5 to 6 atoms in the heterocyclic ring, such as tetrahydropyrrole (II represents indoline type), indole (II represents carbazole or tetrahydrocarbazole type), benzothiazine (II represents phenothiazine type), etc. nuclei. The aromatic nuclei can have substituted thereon Cl, Br, alkoxyl (e. g. methoxyl, etc.), hydroxyl, etc. groups, although, as can be seen from the above general formulas, at least one of the positions ortho to the secondary nitrogen atom in the compounds of Formula I, or peri to that of the secondary nitrogen atom in the compounds of Formula II, should be free of substituents.

As oxidizing agents I can advantageously use mononuclear nitroaromatic compounds of the benzene series, such as nitrobenzene, nitrotoluene, etc., nitroaromaticsulfonic acids, such as m-nitrobenzenesulfonic acid, etc., nitrophenols, such as o- and p-nitrophenol, etc., ferric halides, such as ferric chloride, etc., arsenic pentoxide or arsenic acid, etc. Ordinary air can be used, although less advantageously than the conventional oxidizing agents set out above.

Instead of employing the acid addition salt of the secondary amine as such, according to the method described above and in certain of the following examples, the secondary amine can be suspended in an aqueous solution of an acid, and the reaction carried out in this medium. Under these conditions the acid forms an addition salt with the secondary amine, and the latter undergoes condensation with the aldehyde. If a polymeric aldehyde is employed (e. g. paraldehyde), the acid performs a dual purpose, since it serves to decompose the polymeric aldehyde into the corresponding monomer, which undergoes reaction with the acid addition salt. Hydrochloric or sulfuric acids have been found to provide aqueous solutions which are excellently adapted as reaction media for the process of my invention. A condensation agent or catalyst, such as zinc chloride, etc. can be added to the reaction mixture, although this is not necessary.

The reaction can be carried out at room temperature (about 25° C.) or at temperatures as high as the refluxing temperature of the reactants. Generally, heating the reactants at refluxing temperature provides a rapid, efficient process. Inert diluents, e. g. aliphatic primary alcohols, 1,4-dioxane, etc., can be employed, if desired.

Among the quaternary salts, which have not previously been described, that are obtained according to the process of my invention are those represented by the following general formulas:

III.

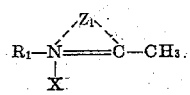

and

IV.

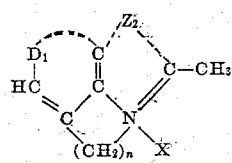

wherein $R_1$ represents a mononuclear aromatic nucleus of the benzene series, $Z_1$ represents the non-metallic atoms necessary to complete a heterocyclic nucleus of the 2-quinoline series, X has the value set forth above, $Z_2$ represents the non-metallic atoms necessary to complete a heterocyclic nucleus of the pyridine series, $D_1$ has the value set forth above, and $n$ represents a positive integer from 2 to 3.

The following examples will serve to illustrate further the manner whereby I practice my invention.

*Example 1.—1,8-trimethylenequinaldinium iodide*

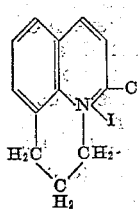

60 g. of tetrahydroquinoline hydrochloride (MW=170) and 115 g. of ferric chloride (MW=162) were dissolved in 400 cc. of absolute ethyl alcohol, and 5 g. of anhydrous zinc chloride were added. The mixture was heated to reflux temperature in a one liter, 3-neck flask fitted with a stirrer, reflux condenser and a dropping funnel. There were then added 90 g. of paraldehyde (MW=132) in small portions to the reaction mixture over a period of one hour. The stirring and heating were continued for 15 hours.

The alcohol was removed from the reaction mixture by distillation, and the salts taken up in three liters of hot water. The aqueous solution was made slightly alkaline with 40 per cent sodium hydroxide, and precipitated hydroxides were filtered off. The filtrate was treated with 20 g. of sodium iodide (MW=150) and taken to dryness under reduced pressure. The combined salts were extracted with 500 cc. of ethyl alcohol, and the alcoholic solution concentrated to 100 cc. and chilled. The 1,8-trimethylenequinaldinium iodide was filtered off and recrystallized from ethyl alcohol. There were thus obtained 22 g. of pure salt, representing a 20 per cent yield.

When a molecularly equivalent amount of the hydrochloride of carbazole is substituted for the tetrahydroquinoline hydrochloride used in the above example, a quaternary salt represented by the following formula can be obtained:

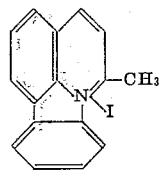

Also, it is possible to use to advantage aldol in place of the paraldehyde.

*Example 2.—1-methylquinaldinium perchlorate*

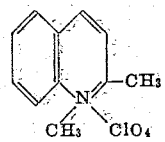

53 g. of N-methylaniline (MW=107) were dissolved in 200 cc. of concentrated hydrochloric acid, and 35 g. of o-nitrophenol were added. The reaction mixture was heated to reflux with stirring and 132 g. of paraldehyde (MW=132) were added dropwise over a two-hour period. The aqueous portion was decanted from the tar, and the tar washed with an additional 200 cc. of hot water. The combined aqueous extracts were chilled, filtered, and washed with benzene. The water portion was mixed with decolorizing carbon, shaken, filtered, and evaporated to dryness under reduced pressure. The residue was extracted with 100 cc. of water, neutralized with an aqueous solution of sodium carbonate, and extracted with chloroform. The aqueous portion was mixed with decolorizing carbon, shaken, and filtered. The quaternary salt was then precipitated by the addition of 20 g. of sodium perchlorate, filtered off and dried. After recrystallization from ethyl alcohol, 10.1 g. of 1-methylquinaldinium perchlorate, representing an 8 per cent yield were obtained. It melted at 154°–156° C.

When a molecularly equivalent amount of N-methyl-p-chloroaniline replaces the N-methylaniline in the above example, a quaternary salt represented by the following formula can be obtained:

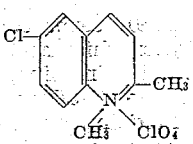

*Example 3.—1,8-Ethylenequinaldinium iodide*

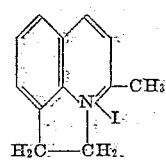

60 g. of indoline (MW=119) were dissolved in 200 cc. of concentrated hydrochloric acid, and 51 g. of m-nitrobenzene sulfonic acid (MW=203) were added. The reaction mixture was brought to reflux and 132 g. of paraldehyde (MW=132) added dropwise with stirring over a period of two hours. The heating was then continued for twelve hours. The aqueous portion was decanted and the residue extracted with two liters of boiling water. The combined aqueous portions were neutralized with aqueous sodium carbonate, extracted with benzene, mixed with decolorizing carbon, and filtered. 30 g. of sodium iodide (MW=150) were added and the aqueous solution evaporated to dryness under reduced pressure. The combined salts were extracted with 500 cc. of hot absolute ethyl alcohol. The alcohol extracts were concentrated to 150 cc., mixed with decolorizing carbon, shaken, filtered, and chilled. The filter cake was then dried to give 30 g. of 1,8-ethylenequinaldinium iodide, representing a 20.1 per cent yield. It melted at 254°–255° C. with decomposition.

When a molecularly equivalent amount of 2,3-trimethylene-indoline replaces the indoline in the above example, a quaternary salt represented by the following formula can be obtained:

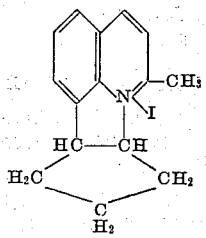

*Example 4.—1-Phenylquinaldinium perchlorate*

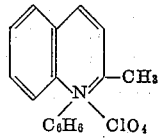

84.5 g. of diphenylamine (MW=169) were dissolved in 400 cc. of nitrobenzene, and 49 g. of sulfuric acid were added dropwise with stirring. While the stirring was continued, 53 g. of crotonaldehyde were added dropwise over a period of an hour to the refluxing reaction mixture. The refluxing was continued for two additional hours. The nitrobenzene was removed by steam distillation and the tar extracted with two liters of boiling water. The aqueous extract was neutralized with sodium carbonate, extracted with benzene, and 30 g. of sodium iodide (MW=150) were added. The water solution was evaporated to dryness, and the product extracted from the salts with 400 cc. of hot absolute ethyl alcohol. The alcohol solution was concentrated to 75 cc. and chilled. The 1-phenylquinaldinium salt was thrown out of solution by the addition of ether. The precipitated salt was then dissolved in 20 cc. of water and precipitated by the addition of 5 g. of sodium perchlorate. The product was filtered off, and after recrystallization from water gave 7.5 g. of 1-phenylquinaldinium perchlorate. It melted at 160°–162° C. with decomposition.

When a molecularly equivalent amount of phenothiazine replaces the diphenylamine in the above example, a quaternary salt represented by the following formula can be obtained:

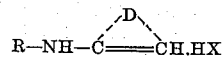

Operating in a manner similar to that illustrated above, other quinaldinium salts can be prepared according to the process of my invention. The quinaldinium salts prepared according to the process of my invention can be used in the preparation of other useful materials, such as polymethine dyes, as described in the application of Donald W. Heseltine and Leslie G. S. Brooker, Serial No. 154,883, filed on April 8, 1950.

This application is a division of my application Serial No. 154,881, filed on April 8, 1950, now U. S. Patent 2,578,303, issued November 21, 1951.

What I claim as my invention and desire secured by Letters Patent of the United States:

1. A process for preparing quinaldinium quaternary salts comprising condensing a compound selected from those represented by the following general formula:

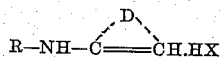

wherein R represents a member selected from the group consisting of an alkyl group and an aryl group, D represents the non-metallic atoms necessary to complete an aromatic nucleus, and X represents an acid radical, with a compound selected from the group consisting of acetaldehyde, paraldehyde, aldol, and crotonaldehyde, in the presence of an oxidizing agent.

2. A process for preparing quinaldinium quaternary salts comprising condensing a compound selected from those represented by the following general formula:

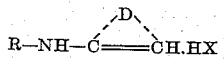

wherein R represents a mononuclear aryl group of the benzene series, D represents the non-metallic atoms necessary to complete a mononuclear aryl group of the benzene series, and X represents an acid radical, with crotonaldehyde in the presence of an oxidizing agent.

3. A process for preparing quinaldinium quaternary salts comprising condensing a compound selected from those represented by the following general formula:

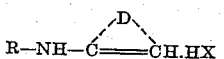

wherein R represents an alkyl group containing from 1 to 2 carbon atoms, D represents the non-metallic atoms necessary to complete a mononuclear aryl group of the benzene series, and X represents an acid radical, with paraldehyde in the presence of an oxidizing agent.

4. A process for preparing quinaldinium quaternary salts comprising condensing a compound selected from those represented by the following general formula:

$$R-NH-C\overset{D}{=\!=\!=}CH.HX$$

wherein R represents a mononuclear aryl group of the benzene series, D represents the nonmetallic atoms necessary to complete a mononuclear aryl group of the benzene series, and X represents an acid radical, with crotonaldehyde in the presence of a mononuclear, nitroaromatic compound of the benzene series.

5. A process for preparing quinaldinium quaternary salts comprising condensing a compound selected from those represented by the following general formula:

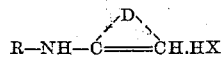

wherein R represents an alkyl group containing from 1 to 2 carbon atoms, D represents the nonmetallic atoms necessary to complete a mononuclear aryl group of the benzene series, and X represents an acid radical, with paraldehyde in the presence of a mononuclear, nitroaromatic compound of the benzene series.

6. A process for preparing quinaldinium quaternary salts comprising condensing a compound selected from those represented by the following general formula:

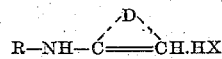

wherein R represents a mononuclear aryl group of the benzene series, D represents the nonmetallic atoms necessary to complete a mononuclear aryl group of the benzene series, and X represents an acid radical, with crotonaldehyde in the presence of nitrobenzene.

7. A process for preparing quinaldinium quaternary salts comprising condensing a compound selected from those represented by the following general formula:

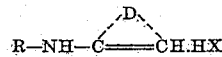

wherein R represents an alkyl group containing from 1 to 2 carbon atoms, D represents the nonmetallic atoms necessary to complete a mononuclear aryl group of the benzene series, and X represents an acid radical, with paraldehyde in the presence of a nitrophenol.

8. A process for preparing a 1-phenylquinaldinium salt comprising condensing diphenylamine sulfate with crotonaldehyde in the presence of nitrobenzene.

DONALD W. HESELTINE.

References Cited in the file of this patent

UNITED STATES PATENTS

| Number | Name | Date |
|---|---|---|
| 2,158,287 | Konig | May 16, 1939 |
| 2,536,973 | Anish | Jan. 2, 1951 |

FOREIGN PATENTS

| Number | Country | Date |
|---|---|---|
| 710,748 | Germany | Sept. 20, 1941 |

OTHER REFERENCES

Fieser et al., "Organic Chemistry" (D. C. Heath and Company; 1944; Boston), page 32.